(12) United States Patent
Shi et al.

(10) Patent No.: US 10,952,223 B2
(45) Date of Patent: Mar. 16, 2021

(54) WIRELESS COMMUNICATION METHOD AND DEVICE

(71) Applicant: Guangdong OPPO Mobile Telecommunications Corp., Ltd., Dongguan (CN)

(72) Inventors: Zhihua Shi, Dongguan (CN); Wenhong Chen, Dongguan (CN); Zhi Zhang, Dongguan (CN)

(73) Assignee: Guangdong OPPO Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 16/832,598

(22) Filed: Mar. 27, 2020

(65) Prior Publication Data

US 2020/0229196 A1    Jul. 16, 2020

Related U.S. Application Data

(63) Continuation of application No. PCT/CN2017/106214, filed on Oct. 13, 2017.

(30) Foreign Application Priority Data

Sep. 29, 2017   (WO) ................ PCT/CN2017/104591

(51) Int. Cl.
*H04W 72/04* (2009.01)
*H04B 7/06* (2006.01)
(Continued)

(52) U.S. Cl.
CPC ...... *H04W 72/0493* (2013.01); *H04B 7/0617* (2013.01); *H04B 7/0626* (2013.01); *H04L 1/0038* (2013.01); *H04L 5/0051* (2013.01)

(58) Field of Classification Search
CPC combination set(s) only.
See application file for complete search history.

(56) References Cited

U.S. PATENT DOCUMENTS

2017/0208568 A1    7/2017  Nam et al.
2018/0367283 A1*  12/2018  Huang ................. H04L 5/0053
(Continued)

FOREIGN PATENT DOCUMENTS

CN    106537964 A    3/2017
EP      3462664 A1    4/2019

OTHER PUBLICATIONS

International search report for International Application No. PCT/CN2017/106214, dated May 30, 2018.
(Continued)

*Primary Examiner* — Xavier S Wong
(74) *Attorney, Agent, or Firm* — Kilpatrick Townsend & Stockton LLP

(57) ABSTRACT

Embodiments of this application provide a wireless communications method and a device, to transmit a response message of a message carrying identification information used to represent a downlink signal of a beam. The method includes: sending, by a terminal, a first uplink message to a network device, where the first uplink message carries identification information of a first signal received by the terminal, and the first signal includes at least a part of at least one signal of a first type transmitted by the network device; determining, by the terminal, a first control resource set CORESET, where the first CORESET is used to receive a first response message for the first uplink message; and receiving, by the terminal, the first response message on the first CORESET.

24 Claims, 9 Drawing Sheets

(51) Int. Cl.
H04L 1/00 (2006.01)
H04L 5/00 (2006.01)

(56) References Cited

U.S. PATENT DOCUMENTS

2019/0058517 A1* 2/2019 Kang .................... H04B 7/0456
2019/0230730 A1* 7/2019 Wang .................... H04W 76/19
2019/0387440 A1* 12/2019 Yiu ..................... H04W 36/0072
2020/0162222 A1* 5/2020 Liu ....................... H04W 48/16

OTHER PUBLICATIONS

International search report for International Application No. PCT/CN2017/104591, dated Jun. 4, 2018.
LG Electronics, Discussion on multi-beam operation for NR-PDCCH, 3GPP TSG RAN WG1 Meeting #90, R1-1713168, Aug. 25, 2017.
Samsung, Multibeam Transmission for PDCCH, 3GPP TSG RAN WG1 Meeting #90, R1-1713614, Aug. 25, 2017.
Mediatek Inc., "Multi-beam Operation for PDCCH", R1-1713676, 3GPP TSG RAN WG1 Meeting #90, Prague, Czech Republic, Aug. 21-25, 2017, 7 pages.
Huawei et al., "Beam indication for control and data channels", R1-1712222, 3GPP TSG RAN WG1 Meeting #90, Prague, Czech Republic, Aug. 21-25, 2017, 7 pages.
The extended search report for European application 17926731.5 dated Oct. 27, 2020, 10 pages.

* cited by examiner

200

```
A terminal sends a first uplink message to a network device, where    210
the first uplink message carries identification information of a first
signal received by the terminal, and the first signal includes at least a
part of at least one signal of a first type transmitted by the network
                              device
```

```
The terminal determines a first CORESET, where the first CORESET    220
is used to receive a first response message for the first uplink message
```

```
The terminal receives the first response message on the first    230
                           CORESET
```

A network device receives a first uplink message sent by a terminal, where the first uplink message carries identification information of a first signal received by the terminal, and the first signal includes at least a part of at least one signal of a first type transmitted by the network device — 310

The network device determines a first control resource set CORESET, where the first CORESET is used to send a first response message for the first uplink message — 320

The network device sends the first response message on the first CORESET — 330

FIG. 3

WIRELESS COMMUNICATION METHOD AND DEVICE

CROSS-REFERENCES TO RELATED APPLICATIONS

This application is a continuation of and claims priority to International Patent Application No. PCT/CN2017/106214, filed Oct. 13, 2017, which claims priority to International Patent Application No. PCT/CN2017/104591, filed Sep. 29, 2017, the contents of which are hereby incorporated by reference in their entirety.

BACKGROUND OF THE INVENTION

Technical Field

This application relates to the field of communications, and more specifically, to a wireless communications method and a device.

Related Art

A network device sends a downlink signal to a terminal through a plurality of transmit beams, and the terminal detects the downlink signal sent by the network device. The terminal may report information about the beams to the network device, for example, identification information of a signal carried in a downlink beam. The network device may send a response message to the terminal. As yet, no solution has been put forward addressing transmission of the response message in a new radio (NR) system.

SUMMARY OF THE INVENTION

Embodiments of this application provide a wireless communications method and a device, to transmit a response message of a message carrying identification information used to represent a downlink signal of a beam.

A first aspect provides a wireless communications method, including: sending, by a terminal, a first uplink message to a network device, where the first uplink message carries identification information of a first signal received by the terminal, and the first signal includes at least a part of at least one signal of a first type transmitted by the network device; determining, by the terminal, a first control resource set CORESET, where the first CORESET is used to receive a first response message for the first uplink message; and receiving, by the terminal, the first response message on the first CORESET.

Therefore, in this embodiment of this application, a terminal sends a first uplink message to a network device, where the first uplink message carries identification information of a first signal received by the terminal, and the first signal includes at least a part of at least one signal of a first type transmitted by the network device; the terminal determines a first CORESET; and the terminal receives the first response message for the first uplink message on the first CORESET, to transmit a response message of a message carrying identification information used to represent a downlink signal of a beam.

With reference to the first aspect, in a possible implementation of the first aspect, all or a part of the at least one signal of the first type is capable of being respectively quasi-co-located with signals of a second type other than the first type for respective spatial received parameters.

With reference to the first aspect or the foregoing another possible implementation, in another possible implementation of the first aspect, the determining, by the terminal, a first CORESET includes: determining, by the terminal, the first CORESET according to a second CORESET corresponding to a signal of the second type with which the first signal is quasi-co-located for a spatial received parameter.

With reference to the first aspect or the foregoing another possible implementation, in another possible implementation of the first aspect, the determining the first CORESET includes: determining the second CORESET as the first CORESET.

With reference to the first aspect or the foregoing another possible implementation, in another possible implementation of the first aspect, different signals of signals of the first type are respectively carried through different transmit beams.

With reference to the first aspect or the foregoing another possible implementation, in another possible implementation of the first aspect, the first uplink message is used to notify the network device of a downlink transmit beam expected by the terminal according to a detection result of detecting the at least one signal.

With reference to the first aspect or the foregoing another possible implementation, in another possible implementation of the first aspect, the determining, by the terminal, a first control resource set CORESET includes: determining, by the terminal, the first CORESET according to a first correspondence between the at least one signal of the first type and at least one CORESET.

With reference to the first aspect or the foregoing another possible implementation, in another possible implementation of the first aspect, a CORESET corresponding to each of the at least one signal is used to receive a response message of an uplink message corresponding to the signal.

With reference to the first aspect or the foregoing another possible implementation, in another possible implementation of the first aspect, the method further includes: receiving, by the terminal, first indication information sent by the network device, where the first indication information is used to indicate the first correspondence.

With reference to the first aspect or the foregoing another possible implementation, in another possible implementation of the first aspect, the determining, by the terminal, a first control resource set CORESET includes: determining the first CORESET according to a first uplink transmission resource or a first code, where the first uplink transmission resource is a resource for sending the first uplink signal, and the first code is a code for identifying the first signal.

With reference to the first aspect or the foregoing another possible implementation, in another possible implementation of the first aspect, the determining the first CORESET according to a first uplink transmission resource or a first code includes: determining the first CORESET corresponding to the first uplink transmission resource or first code according to a second correspondence between at least one uplink transmission resource or code and at least one CORESET.

With reference to the first aspect or the foregoing another possible implementation, in another possible implementation of the first aspect, each uplink transmission resource or code corresponds to an uplink message of the at least one signal of the first type, and a CORESET corresponding to the uplink transmission resource or code is used to receive a response message of the uplink message sent by using the uplink transmission resource or code.

With reference to the first aspect or the foregoing another possible implementation, in another possible implementation of the first aspect, the method further includes: receiving second indication information sent by the network device, where the second indication information is used to indicate the second correspondence.

With reference to the first aspect or the foregoing another possible implementation, in another possible implementation of the first aspect, the method further includes: receiving a second response message by using the first CORESET, where the second response message is a response message of an uplink message sent on a first random access resource, and the first random access resource is a random access resource corresponding to the first uplink transmission resource.

With reference to the first aspect or the foregoing another possible implementation, in another possible implementation of the first aspect, the determining the first CORESET according to a first uplink transmission resource or a first code includes: determining a first random access resource, where the first random access resource is a random access resource corresponding to the first uplink transmission resource; determining a third CORESET according to the first random access resource; and determining the first CORESET according to the third CORESET.

With reference to the first aspect or the foregoing another possible implementation, in another possible implementation of the first aspect, the third CORESET is configured to receive a second response message, where the second response message is a response message for an uplink access message sent on the first random access resource.

With reference to the first aspect or the foregoing another possible implementation, in another possible implementation of the first aspect, the determining the third CORESET according to the first random access resource includes: determining the third CORESET corresponding to the first random access resource according to a third correspondence between at least one random access resource and at least one CORESET.

With reference to the first aspect or the foregoing another possible implementation, in another possible implementation of the first aspect, a CORESET corresponding to each random access resource is used to receive a response message of an uplink access message sent on the random access resource.

With reference to the first aspect or the foregoing another possible implementation, in another possible implementation of the first aspect, the determining the first CORESET according to the third CORESET includes: determining the third CORESET as the first CORESET.

With reference to the first aspect or the foregoing another possible implementation, in another possible implementation of the first aspect, the method further includes: receiving third indication information sent by the network device, where the third indication information is used to indicate the third correspondence.

With reference to the first aspect or the foregoing another possible implementation, in another possible implementation of the first aspect, the first uplink transmission resource and the first random access resource are frequency-division multiplexed or code-division multiplexed.

With reference to the first aspect or the foregoing another possible implementation, in another possible implementation of the first aspect, the signals of the first type are channel state information reference signals CSI-RS or synchronization signal blocks.

A second aspect provides a wireless communications method, including: receiving, by a network device, a first uplink message sent by a terminal, where the first uplink message carries identification information of a first signal received by the terminal, and the first signal includes at least a part of at least one signal of a first type transmitted by the network device;

determining, by the network device, a first control resource set CORESET, where the first CORESET is used to send a first response message for the first uplink message; and sending, by the network device, the first response message on the first CORESET.

Therefore, in this embodiment of this application, a network device receives a first uplink message, where the first uplink message carries identification information of a first signal received by the terminal, and the first signal includes at least a part of at least one signal of a first type transmitted by the network device; the network device determines the first CORESET; and the network device sends the first response message for the first uplink message on the first CORESET, to transmit a response message of a message carrying identification information used to represent a downlink signal of a beam.

With reference to the second aspect, in a possible implementation of the second aspect, all or a part of the at least one signal of the first type is capable of being respectively quasi-co-located with signals of a second type other than the first type for respective spatial received parameters.

With reference to the second aspect or the foregoing another possible implementation, in another possible implementation of the second aspect, the determining, by the network device, a first control resource set CORESET includes: determining, by the network device, the first CORESET according to a second CORESET corresponding to a signal of the second type with which the first signal is quasi-co-located for a spatial received parameter.

With reference to the second aspect or the foregoing another possible implementation, in another possible implementation of the second aspect, the determining the first CORESET includes: determining the second CORESET as the first CORESET.

With reference to the second aspect or the foregoing another possible implementation, in another possible implementation of the second aspect, different signals of signals of the first type are respectively carried through different transmit beams.

With reference to the second aspect or the foregoing another possible implementation, in another possible implementation of the second aspect, the first uplink message is used to notify the network device of a downlink transmit beam expected by the terminal according to a detection result of detecting the at least one signal.

With reference to the second aspect or the foregoing another possible implementation, in another possible implementation of the second aspect, the determining, by the network device, a first control resource set CORESET includes: determining, by the network device, the first CORESET according to a first correspondence between the at least one signal of the first type and at least one CORESET.

With reference to the second aspect or the foregoing another possible implementation, in another possible implementation of the second aspect, a CORESET corresponding to each of the at least one signal is used to send a response message of an uplink message corresponding to the signal.

With reference to the second aspect or the foregoing another possible implementation, in another possible implementation of the second aspect, the method further includes: sending, by the network device, first indication information to the terminal, where the first indication information is used to indicate the first correspondence.

With reference to the second aspect or the foregoing another possible implementation, in another possible implementation of the second aspect, the determining, by the network device, a first control resource set CORESET includes: determining the first CORESET according to a first uplink transmission resource or a first code, where the first uplink transmission resource is a resource for sending, by the terminal, the first uplink signal, and the first code is a code for identifying the first signal.

With reference to the second aspect or the foregoing another possible implementation, in another possible implementation of the second aspect, the determining the first CORESET according to a first uplink transmission resource or a first code includes: determining the first CORESET corresponding to the first uplink transmission resource or first code according to a second correspondence between at least one uplink transmission resource or code and at least one CORESET.

With reference to the second aspect or the foregoing another possible implementation, in another possible implementation of the second aspect, each uplink transmission resource or code corresponds to an uplink message of the at least one signal of the first type, and a CORESET corresponding to the uplink transmission resource or code is used to send a response message of the uplink message sent by using the uplink transmission resource or code.

With reference to the second aspect or the foregoing another possible implementation, in another possible implementation of the second aspect, the method further includes: sending, by the network device, second indication information to the terminal, where the second indication information is used to indicate the second correspondence.

With reference to the second aspect or the foregoing another possible implementation, in another possible implementation of the second aspect, the method further includes: sending a second response message by using the first CORESET, where the second response message is a response message of an uplink message sent on a first random access resource, and the first random access resource is a random access resource corresponding to the first uplink transmission resource.

With reference to the second aspect or the foregoing another possible implementation, in another possible implementation of the second aspect, the determining the first CORESET according to a first uplink transmission resource or a first code includes: determining a first random access resource, where the first random access resource is a random access resource corresponding to the first uplink transmission resource; determining a third CORESET according to the first random access resource; and determining the first CORESET according to the third CORESET.

With reference to the second aspect or the foregoing another possible implementation, in another possible implementation of the second aspect, the third CORESET is used to send a second response message, where the second response message is a response message for an uplink access message sent on the first random access resource.

With reference to the second aspect or the foregoing another possible implementation, in another possible implementation of the second aspect, the determining the third CORESET according to the first random access resource includes: determining the third CORESET corresponding to the first random access resource according to a third correspondence between at least one random access resource and at least one CORESET.

With reference to the second aspect or the foregoing another possible implementation, in another possible implementation of the second aspect, a CORESET corresponding to each random access resource is used to send a response message of an uplink access message sent on the random access resource.

With reference to the second aspect or the foregoing another possible implementation, in another possible implementation of the second aspect, the determining the first CORESET according to the third CORESET includes: determining the third CORESET as the first CORESET.

With reference to the second aspect or the foregoing another possible implementation, in another possible implementation of the second aspect, the method further includes: sending, by the network device, third indication information to the terminal, where the third indication information is used to indicate the third correspondence.

With reference to the second aspect or the foregoing another possible implementation, in another possible implementation of the second aspect, the first uplink transmission resource and the first random access resource are frequency-division multiplexed or code-division multiplexed.

With reference to the second aspect or the foregoing another possible implementation, in another possible implementation of the second aspect, the signals of the first type are channel state information reference signals CSI-RS or synchronization signal blocks.

A third aspect provides a wireless communications method, including: sending, by a terminal, a first uplink message to a network device, where the first uplink message carries identification information of a first signal received by the terminal, and the first signal includes at least a part of at least one signal of a first type transmitted by the network device; determining, by the terminal, a first time-frequency resource set and/or search space, where the first time-frequency resource set and/or search space is used to receive a first response message for the first uplink message; and receiving, by the terminal, the first response message on the first time-frequency resource set and/or search space.

Therefore, in this embodiment of this application, a terminal sends a first uplink message to a network device, where the first uplink message carries identification information of a first signal received by the terminal, and the first signal includes at least a part of at least one signal of a first type transmitted by the network device; the terminal determines a first time-frequency resource set and/or search space; and the terminal receives the first response message for the first uplink message on the first time-frequency resource set and/or search space, to transmit a response message of a message carrying identification information used to represent a downlink signal of a beam.

With reference to the third aspect, in a possible implementation of the third aspect, all or a part of the at least one signal of the first type is capable of being respectively quasi-co-located with signals of a second type other than the first type for respective spatial received parameters.

With reference to the third aspect or the foregoing another possible implementation, in another possible implementation of the third aspect, the determining, by the terminal, a first time-frequency resource set and/or search space includes: determining, by the terminal, the first time-frequency resource set and/or search space according to a second time-frequency resource set and/or search space corresponding to a signal of the second type with which the first signal is quasi-co-located for a spatial received parameter.

With reference to the third aspect or the foregoing another possible implementation, in another possible implementation of the third aspect, the determining the first time-frequency resource set and/or search space includes: determining the second time-frequency resource set and/or search space as the first time-frequency resource set and/or search space.

With reference to the third aspect or the foregoing another possible implementation, in another possible implementation of the third aspect, different signals of signals of the first type are respectively carried through different transmit beams.

With reference to the third aspect or the foregoing another possible implementation, in another possible implementation of the third aspect, the first uplink message is used to notify the network device of a downlink transmit beam expected by the terminal according to a detection result of detecting the at least one signal.

With reference to the third aspect or the foregoing another possible implementation, in another possible implementation of the third aspect, the determining, by the terminal, a first time-frequency resource set and/or search space includes: determining, by the terminal, the first time-frequency resource set and/or search space according to a first correspondence between the at least one signal of the first type and at least one time-frequency resource set and/or search space.

With reference to the third aspect or the foregoing another possible implementation, in another possible implementation of the third aspect, a time-frequency resource set and/or search space corresponding to each of the at least one signal is used to receive a response message of an uplink message corresponding to the signal.

With reference to the third aspect or the foregoing another possible implementation, in another possible implementation of the third aspect, the method further includes: receiving, by the terminal, first indication information sent by the network device, where the first indication information is used to indicate the first correspondence.

With reference to the third aspect or the foregoing another possible implementation, in another possible implementation of the third aspect, the determining, by the terminal, a first time-frequency resource set and/or search space includes: determining the first time-frequency resource set and/or search space according to a first uplink transmission resource or a first code, where the first uplink transmission resource is a resource for sending the first uplink signal, and the first code is a code for identifying the first signal.

With reference to the third aspect or the foregoing another possible implementation, in another possible implementation of the third aspect, the determining the first time-frequency resource set and/or search space according to a first uplink transmission resource or a first code includes: determining the first time-frequency resource set and/or search space corresponding to the first uplink transmission resource or first code according to a second correspondence between at least one uplink transmission resource or code and at least one time-frequency resource set and/or search space.

With reference to the third aspect or the foregoing another possible implementation, in another possible implementation of the third aspect, each uplink transmission resource or code corresponds to an uplink message of the at least one signal of the first type, and a time-frequency resource set and/or search space corresponding to the uplink transmission resource or code is used to receive a response message of the uplink message sent by using the uplink transmission resource or code.

With reference to the third aspect or the foregoing another possible implementation, in another possible implementation of the third aspect, the method further includes: receiving second indication information sent by the network device, where the second indication information is used to indicate the second correspondence.

With reference to the third aspect or the foregoing another possible implementation, in another possible implementation of the third aspect, the method further includes: receiving a second response message by using the first time-frequency resource set and/or search space, where the second response message is a response message of an uplink message sent on a first random access resource, and the first random access resource is a random access resource corresponding to the first uplink transmission resource.

With reference to the third aspect or the foregoing another possible implementation, in another possible implementation of the third aspect, the determining the first time-frequency resource set and/or search space according to a first uplink transmission resource or a first code includes: determining a first random access resource, where the first random access resource is a random access resource corresponding to the first uplink transmission resource; determining a third time-frequency resource set and/or search space according to the first random access resource; and determining the first time-frequency resource set and/or search space according to the third time-frequency resource set and/or search space.

With reference to the third aspect or the foregoing another possible implementation, in another possible implementation of the third aspect, the third time-frequency resource set and/or search space is configured to receive a second response message, where the second response message is a response message for an uplink access message sent on the first random access resource.

With reference to the third aspect or the foregoing another possible implementation, in another possible implementation of the third aspect, the determining the second time-frequency resource set and/or search space according to the first random access resource includes: determining the second time-frequency resource set and/or search space corresponding to the first random access resource according to a third correspondence between at least one random access resource and at least one time-frequency resource set and/or search space.

With reference to the third aspect or the foregoing another possible implementation, in another possible implementation of the third aspect, a time-frequency resource set and/or search space corresponding to each random access resource is used to receive a response message of an uplink access message sent on the random access resource.

With reference to the third aspect or the foregoing another possible implementation, in another possible implementation of the third aspect, the determining the first time-frequency resource set and/or search space according to the third time-frequency resource set and/or search space includes: determining the third time-frequency resource set and/or search space as the first time-frequency resource set and/or search space.

With reference to the third aspect or the foregoing another possible implementation, in another possible implementation of the third aspect, the method further includes: receiving third indication information sent by the network device, where the third indication information is used to indicate the third correspondence.

With reference to the third aspect or the foregoing another possible implementation, in another possible implementation of the third aspect, the first uplink transmission resource and the first random access resource are frequency-division multiplexed or code-division multiplexed.

With reference to the third aspect or the foregoing another possible implementation, in another possible implementation of the third aspect, the signals of the first type are channel state information reference signals CSI-RS or synchronization signal blocks.

A fourth aspect provides a wireless communications method, including: receiving, by a network device, a first uplink message sent by a terminal, where the first uplink message carries identification information of a first signal received by the terminal, and the first signal includes at least a part of at least one signal of a first type transmitted by the network device; determining, by the network device, a first time-frequency resource set and/or search space, where the first time-frequency resource set and/or search space is used to send a first response message for the first uplink message; and sending, by the network device, the first response message on the first time-frequency resource set and/or search space.

Therefore, in this embodiment of this application, a network device receives a first uplink message, where the first uplink message carries identification information of a first signal received by the terminal, and the first signal includes at least a part of at least one signal of a first type transmitted by the network device; the network device determines a first time-frequency resource set and/or search space; and the network device sends the first response message for the first uplink message on the first time-frequency resource set and/or search space, to transmit a response message of a message carrying identification information used to represent a downlink signal of a beam.

With reference to the fourth aspect, in a possible implementation of the fourth aspect, all or a part of the at least one signal of the first type is capable of being respectively quasi-co-located with signals of a second type other than the first type for respective spatial received parameters.

With reference to the fourth aspect or the foregoing another possible implementation, in another possible implementation of the fourth aspect, the determining, by the network device, a first time-frequency resource set and/or search space includes: determining, by the network device, the first time-frequency resource set and/or search space according to a second time-frequency resource set and/or search space corresponding to a signal of the second type with which the first signal is quasi-co-located for a spatial received parameter.

With reference to the fourth aspect or the foregoing another possible implementation, in another possible implementation of the fourth aspect, the determining the first time-frequency resource set and/or search space includes: determining the second time-frequency resource set and/or search space as the first time-frequency resource set and/or search space.

With reference to the fourth aspect or the foregoing another possible implementation, in another possible implementation of the fourth aspect, different signals of signals of the first type are respectively carried through different transmit beams.

With reference to the fourth aspect or the foregoing another possible implementation, in another possible implementation of the fourth aspect, the first uplink message is used to notify the network device of a downlink transmit beam expected by the terminal according to a detection result of detecting the at least one signal.

With reference to the fourth aspect or the foregoing another possible implementation, in another possible implementation of the fourth aspect, the determining, by the network device, a first time-frequency resource set and/or search space includes: determining, by the network device, the first time-frequency resource set and/or search space according to a first correspondence between the at least one signal of the first type and at least one time-frequency resource set and/or search space.

With reference to the fourth aspect or the foregoing another possible implementation, in another possible implementation of the fourth aspect, a time-frequency resource set and/or search space corresponding to each of the at least one signal is used to send a response message of an uplink message corresponding to the signal.

With reference to the fourth aspect or the foregoing another possible implementation, in another possible implementation of the fourth aspect, the method further includes: sending, by the network device, first indication information to the terminal, where the first indication information is used to indicate the first correspondence.

With reference to the fourth aspect or the foregoing another possible implementation, in another possible implementation of the fourth aspect, the determining, by the network device, a first time-frequency resource set and/or search space includes: determining the first time-frequency resource set and/or search space according to a first uplink transmission resource or a first code, where the first uplink transmission resource is a resource for sending, by the terminal, the first uplink signal, and the first code is a code for identifying the first signal.

With reference to the fourth aspect or the foregoing another possible implementation, in another possible implementation of the fourth aspect, the determining the first time-frequency resource set and/or search space according to a first uplink transmission resource or a first code includes: determining the first time-frequency resource set and/or search space corresponding to the first uplink transmission resource or first code according to a second correspondence between at least one uplink transmission resource or code and at least one time-frequency resource set and/or search space.

With reference to the fourth aspect or the foregoing another possible implementation, in another possible implementation of the fourth aspect, each uplink transmission resource or code corresponds to an uplink message of the at least one signal of the first type, and a time-frequency resource set and/or search space corresponding to the uplink transmission resource or code is used to send a response message of the uplink message sent by using the uplink transmission resource or code.

With reference to the fourth aspect or the foregoing another possible implementation, in another possible implementation of the fourth aspect, the method further includes: sending, by the network device, second indication information to the terminal, where the second indication information is used to indicate the second correspondence.

With reference to the fourth aspect or the foregoing another possible implementation, in another possible implementation of the fourth aspect, the method further includes: sending a second response message by using the first time-frequency resource set and/or search space, where the second response message is a response message of an uplink message sent on a first random access resource, and the first random access resource is a random access resource corresponding to the first uplink transmission resource.

With reference to the fourth aspect or the foregoing another possible implementation, in another possible implementation of the fourth aspect, the determining the first time-frequency resource set and/or search space according to a first uplink transmission resource or a first code includes: determining a first random access resource, where the first random access resource is a random access resource corresponding to the first uplink transmission resource; determining a third time-frequency resource set and/or search space according to the first random access resource; and determining the first time-frequency resource set and/or search space according to the third time-frequency resource set and/or search space.

With reference to the fourth aspect or the foregoing another possible implementation, in another possible implementation of the fourth aspect, the third time-frequency resource set and/or search space is used to send a second response message, where the second response message is a response message for an uplink access message sent on the first random access resource.

With reference to the fourth aspect or the foregoing another possible implementation, in another possible implementation of the fourth aspect, the determining the second time-frequency resource set and/or search space according to the first random access resource includes: determining the second time-frequency resource set and/or search space corresponding to the first random access resource according to a third correspondence between at least one random access resource and at least one time-frequency resource set and/or search space.

With reference to the fourth aspect or the foregoing another possible implementation, in another possible implementation of the fourth aspect, a time-frequency resource set and/or search space corresponding to each random access resource is used to send a response message of an uplink access message sent on the random access resource.

With reference to the fourth aspect or the foregoing another possible implementation, in another possible implementation of the fourth aspect, the determining the first time-frequency resource set and/or search space according to the third time-frequency resource set and/or search space includes: determining the third time-frequency resource set and/or search space as the first time-frequency resource set and/or search space.

With reference to the fourth aspect or the foregoing another possible implementation, in another possible implementation of the fourth aspect, the method further includes: sending, by the network device, third indication information to the terminal, where the third indication information is used to indicate the third correspondence.

With reference to the fourth aspect or the foregoing another possible implementation, in another possible implementation of the fourth aspect, the first uplink transmission resource and the first random access resource are frequency-division multiplexed or code-division multiplexed.

With reference to the fourth aspect or the foregoing another possible implementation, in another possible implementation of the fourth aspect, the signals of the first type are channel state information reference signals CSI-RS or synchronization signal blocks.

A fifth aspect provides a terminal, configured to perform the method in the first aspect or any possible implementation of the first aspect or the method in the third aspect or any possible implementation of the third aspect. Specifically, the terminal device includes functional modules configured to perform the method in the first aspect or any possible implementation of the first aspect or the method in the third aspect or any possible implementation of the third aspect.

A sixth aspect provides a network device, configured to perform the method in the second aspect or any possible implementation of the second aspect or the method in the fourth aspect or any possible implementation of the fourth aspect. Specifically, the network device includes functional modules configured to perform the method in the second aspect or any possible implementation of the second aspect or the method in the fourth aspect or any possible implementation of the fourth aspect.

A seventh aspect provides a terminal, including a processor, a memory, and a transceiver. The processor, the memory, and the transceiver communicate with each other through an internal connection path, to transfer a control signal and/or a data signal, to enable the terminal to perform the method in the first aspect or any possible implementation of the first aspect or the method in the third aspect or any possible implementation of the third aspect.

An eighth aspect provides a network device, including a processor, a memory, and a transceiver. The processor, the memory, and the transceiver communicate with each other through an internal connection path, to transfer a control signal and/or a data signal, to enable the network device to perform the method in the second aspect or any possible implementation of the second aspect or the method in the fourth aspect or any possible implementation of the fourth aspect.

A ninth aspect provides a computer readable medium, configured to store a computer program, where the computer program includes an instruction used to perform any one of the foregoing methods or any possible implementation.

A tenth aspect provides a computer program product including an instruction, and when the computer program product is run on a computer, the computer is enabled to perform any one of the foregoing methods or the method in any possible implementation.

BRIEF DESCRIPTION OF THE DRAWINGS

To describe the technical solutions in the embodiments of this application more clearly, the following briefly introduces the accompanying drawings required for describing the embodiments or the prior art. Apparently, the accompanying drawings in the following description show merely some embodiments of this application, and a person of ordinary skill in the art may still derive other drawings from these accompanying drawings without creative efforts.

FIG. 2 is a schematic flowchart of a wireless communications method according to an embodiment of this application;

FIG. 3 is a schematic flowchart of a wireless communications method according to an embodiment of this application;

DETAILED DESCRIPTION OF THE INVENTION

The technical solutions of the embodiments of this application will be described in the following with reference to the accompanying drawings. It is obvious that the embodiments to be described are a part rather than all of the embodiments of this application. All other embodiments obtained by persons of ordinary skill in the art based on the embodiments of the present invention without making creative efforts shall fall within the protection scope of the present invention.

The technical solutions according to the embodiments of this application may be applied to a variety of communications systems, such as a Global System for Mobile communications ("GSM" for short) system, a Code Division Multiple Access ("CDMA" for short) system, a Wideband Code Division Multiple Access ("WCDMA" for short) system, a General Packet Radio Service ("GPRS" for short), a Long Term Evolution ("LTE" for short) system, an LTE Frequency Division Duplex ("FDD" for short) system, an LTE Time Division Duplex ("TDD" for short), a Universal Mobile Telecommunication System ("UMTS" for short), a Worldwide Interoperability for Microwave Access ("WiMAX" for short) communications system, a future 5G system, or the like.

Figure 1:
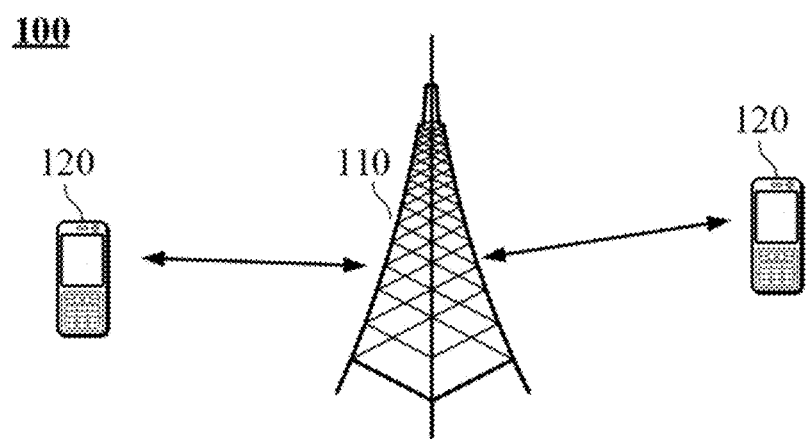
FIG. 1 is a schematic diagram of a wireless communications system according to an embodiment of this application.

FIG. 1 shows a wireless communications system 100 to which an embodiment of this application is applied. The wireless communications system 100 may include a network device 110. The network device 100 may be a device communicating with a terminal device. The network device 100 may provide communications coverage to a particular geographic area, and may communicate with a terminal device (for example, UE) located within the coverage area. Optionally, the network device 100 may be a base transceiver station (BTS) in a GSM system or CDMA system, or may be a NodeB (NB) in a WCDMA system, or may be an evolved NodeB (eNB or eNodeB) in an LTE system, or a wireless controller in a cloud radio access network (CRAN), or the network device may be a relay station, an access point, an in-vehicle device, a wearable device, a network side device in a future 5G network, a network device in a future evolved public land mobile network (PLMN) or the like.

The wireless communications system 100 further includes at least one terminal device 120 located within the coverage range of the network device 110. The terminal device 120 may be mobile or fixed. Optionally, the terminal device 120 may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved PLMN or the like.

Optionally, the terminal devices 120 may perform device to device (D2D) communication with each other.

Optionally, the 5G system or network may be further referred to as a new radio (NR) system or network.

FIG. 1 shows one network device and two terminal devices as an example. Optionally, the wireless communications system 100 may include a plurality of network devices and coverage of each network device may include another quantity of terminal devices. This is not limited in this embodiment of this application.

Optionally, the wireless communications system 100 may further include other network entities such as a network controller and a mobility management entity. This is not limited in this embodiment of this application.

It should be understood that, terms "system" and "network" in this specification are usually interchangeably used in this specification. The term "and/or" in this specification is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

FIG. 2 is a schematic flowchart of a wireless communications method 200 according to an embodiment of this application. The method 200 may be optionally applied to the system shown in FIG. 1, but is not limited thereto. The method 200 may be optionally performed by a terminal. The method 200 includes at least a part of the following content.

In 210, a terminal sends a first uplink message to a network device, where the first uplink message carries identification information of a first signal received by the terminal, and the first signal includes at least a part of at least one signal of a first type transmitted by the network device.

Optionally, the signals of the first type are channel state information reference signals (CSI-RS) or synchronization signal blocks (SS Block).

Optionally, all or a part of the at least one signal of the first type is capable of being respectively quasi-co-located with signals of a second type other than the first type for respective spatial received parameters.

Specifically, the signals of the first type may be quasi-co-located with the signals of the second type for the spatial received parameters. To be specific, the network sends a signal 1 of the first type through a beam 1, and if the signal 1 and a signal 2 of the second type are quasi-co-located for a spatial received parameter, the network sends the signal 2 through the transmit beam 1, or the terminal sends the signal 2 through an uplink transmit beam 1 that is the same as the transmit beam 1.

Optionally, different signals of signals of the first type are respectively carried through different transmit beams.

Specifically, the network device may send downlink signals of the first type through a plurality of transmit beams, for example, CSI-RSs or synchronization signal blocks, and each downlink beam may carry identification information of a sent downlink signal, where different downlink beams carry different identification information of downlink signals. In this case, downlink signals having the same identification information may be referred to as one downlink signal, and a quantity of downlink signals may be equal to a quantity of transmit beams.

Optionally, the first uplink message is used to notify the network device of a downlink transmit beam expected by the terminal according to a detection result of detecting the at least one signal.

Specifically, the terminal may detect the network device through the downlink signals sent through the plurality of transmit beams, and may determine, according to a detection result of the detecting, a transmit beam that has relatively good signal quality (for example, that is optimal or whose quality satisfies a predetermined value) and notify the transmit beam to the network device. Specifically, identification information of a signal whose downlink signal quality is optimal may be notified to the network device.

In 220, the terminal determines a first control resource set (CORESET), where the first CORESET is used to receive a first response message for the first uplink message.

Optionally, a CORESET may include at least one physical downlink control channel (PDCCH) candidate location.

Optionally, a PDCCH candidate may have an aggregation level of 1, 2, 4 or 8, that is, may occupy 1, 2, 4 or 8 control channel elements (CCE).

Optionally, one CORESET may include PDCCH candidates having a plurality of aggregation levels, for example, simultaneously include PDCCH candidates having aggregation levels 1, 2, 4 and 8.

In 230, the terminal receives the first response message on the first CORESET.

Specifically, the terminal may perform blind detection in the first CORESET, so as to obtain the first response message.

For convenience of more clearly understanding this application, how the terminal determines the first CORESET is described below with reference to several implementations.

Manner 1:

The terminal determines the first CORESET according to a second CORESET corresponding to a signal of the second type with which the first signal is quasi-co-located for a spatial received parameter.

Specifically, the terminal may determine a signal of the second type with which the first signal is quasi-co-located for a spatial received parameter, determine a CORESET corresponding to the signal of the second type, and accordingly determine the first CORESET.

The signal of the second type may be an uplink signal, and therefore the CORESET corresponding to the signal of the second type may be a CORESET used to receive a response message for the signal.

Alternatively, the signal of the second type may be a downlink signal, and therefore the CORESET corresponding to the second type may be a CORESET for receiving the signal.

Optionally, at least one signal of the second type and at least one CORESET may have a direct correspondence.

Signals of the second type and CORESETs are in a one-to-one correspondence; or a plurality of signals of the second type may correspond to one CORESET; or one signal of the second type may correspond to a plurality of CORESETs.

Optionally, the terminal may determine the second CORESET as the first CORESET.

Alternatively, the terminal may change the second CORESET, for example, increase resources or reduce resources, so as to obtain the first CORESET.

Manner 2:

The terminal determines the first CORESET according to a first correspondence between the at least one signal of the first type and at least one CORESET.

Specifically, at least one signal of the first type and at least one CORESET may have a direct correspondence.

Signal having different identification information may correspond to different CORESETs. For example, signals of the first type and CORESETs are in a one-to-one correspondence; or a plurality of signals may correspond to one CORESET; or one signal may correspond to a plurality of CORESETs.

Optionally, a CORESET corresponding to each of the at least one signal is used to receive a response message of an uplink message corresponding to the signal.

Optionally, the terminal receives first indication information sent by the network device, where the first indication information is used to indicate the first correspondence. To be specific, the first correspondence may be configured by the network device for the terminal. Certainly, the first correspondence may alternatively be preset in the terminal.

Manner 3:

The terminal determines the first CORESET according to a first uplink transmission resource or a first code, where the first uplink transmission resource is a resource for sending the first uplink signal, and the first code is a code for identifying the first signal.

Specifically, the terminal may determine the first CORESET according to a resource for sending the first uplink signal and a code for identifying the first signal.

In an implementation, the first CORESET corresponding to the first uplink transmission resource or first code is determined according to a second correspondence between at least one uplink transmission resource or code and at least one CORESET.

Specifically, at least one uplink transmission resource and at least one CORESET may have a direct correspondence, where uplink transmission resources for carrying different identification information may correspond to different CORESETs. For example, uplink transmission resources and CORESETs are in a one-to-one correspondence; or a plurality of uplink transmission resources may correspond to one CORESET; or one uplink transmission resource may correspond to a plurality of CORESETs.

Herein, a resource for sending one uplink signal (carrying an identifier of one signal of the first type) may be referred to as one resource, but this application is not limited thereto, and a division unit of an uplink transmission resource may alternatively be in another form.

Optionally, the aforementioned uplink transmission resource and a random access resource may be frequency-division multiplexed or code-division multiplexed.

Alternatively, at least one code and at least one CORESET may have a direct correspondence, where codes for identifying different signals of the first type may correspond to different CORESETs. For example, codes and CORESETs are in a one-to-one correspondence; or a plurality of codes may correspond to one CORESET; or one code may correspond to a plurality of CORESETs.

Optionally, the aforementioned code and a random access preamble may have a same sequence but different cyclic shifts.

Optionally, codes and uplink signals of the first type may be in a one-to-one correspondence, that is, one code may identify one uplink signal, but this embodiment of this application is not limited thereto. For example, one code may identify a group of signals.

Optionally, each uplink transmission resource or code corresponds to an uplink message of the at least one signal of the first type, and a CORESET corresponding to the uplink transmission resource or code is used to receive a response message of the uplink message sent by using the uplink transmission resource or code.

Optionally, the terminal receives second indication information sent by the network device, where the second indication information is used to indicate the second correspondence. To be specific, the second correspondence may be configured by the network device for the terminal. Certainly, the second correspondence may alternatively be preset in the terminal.

Optionally, a second response message is received by using the first CORESET, where the second response message is a response message of an uplink message sent on a first random access resource, and the first random access resource is a random access resource corresponding to the first uplink transmission resource.

Specifically, the CORESET configured to receive the foregoing first response message may be used to receive the response message of the uplink message sent on the first random access resource. Herein, a random access resource and an uplink transmission resource may have a correspondence, and the correspondence may be optionally related to a multiplexing relationship. To be specific, a random access resource and an uplink transmission resource have a frequency-division multiplexing or code-division multiplexing relationship, and therefore the random access resource is a random access resource corresponding to the uplink transmission resource.

In another implementation, a first random access resource is determined, where the first random access resource is a random access resource corresponding to the first uplink transmission resource; a third CORESET is determined according to the first random access resource; and the first CORESET is determined according to the third CORESET.

Specifically, a random access resource and an uplink transmission resource may have a correspondence, and the correspondence may be optionally related to a multiplexing relationship. To be specific, a random access resource and an uplink transmission resource have a frequency-division multiplexing or code-division multiplexing relationship, and therefore the random access resource is a random access resource corresponding to the uplink transmission resource. The terminal may determine the first random access resource corresponding to the first uplink transmission resource, determine a CORESET corresponding to the first random access resource accordingly, and determine the first CORESET according to the CORESET corresponding to the random access resource.

Optionally, the third CORESET is configured to receive a second response message, where the second response message is a response message for an uplink access message sent on the first random access resource.

Optionally, the second CORESET corresponding to the first random access resource is determined according to a third correspondence between at least one random access resource and at least one CORESET.

Specifically, at least one random access resource and at least one CORESET may have a direct correspondence, where different random access resources may correspond to different CORESETs. For example, random access resources and CORESETs are in a one-to-one correspondence; or a plurality of random access resources may correspond to one CORESET; or one random access resource may correspond to a plurality of CORESETs.

Optionally, a CORESET corresponding to each random access resource is used to receive a response message of an uplink access message sent on the random access resource.

Optionally, the terminal may determine the third CORESET as the first CORESET.

Alternatively, the terminal may change the third CORESET, for example, increase resources or reduce resources, so as to obtain the first CORESET.

Optionally, the terminal receives third indication information sent by the network device, where the third indication information is used to indicate the third correspondence. To be specific, the third correspondence may be configured by the network device for the terminal. Certainly, the third correspondence may alternatively be preset in the terminal.

Therefore, in this embodiment of this application, a terminal sends a first uplink message to a network device, where the first uplink message carries identification information of a first signal received by the terminal, and the first signal includes at least a part of at least one signal of a first type transmitted by the network device; the terminal determines a first CORESET; and the terminal receives the first response message for the first uplink message on the first CORESET, to transmit a response message of a message carrying identification information used to represent a downlink signal of a beam.

FIG. 3 is a schematic flowchart of a wireless communications method 300 according to an embodiment of this application. The method 300 includes at least a part of the following content.

In 310, a network device receives a first uplink message sent by a terminal, where the first uplink message carries identification information of a first signal received by the terminal, and the first signal includes at least a part of at least one signal of a first type transmitted by the network device.

In 320, the network device determines a first control resource set CORESET, where the first CORESET is used to send a first response message for the first uplink message.

In 330, the network device sends the first response message on the first CORESET.

Optionally, all or a part of the at least one signal of the first type is capable of being respectively quasi-co-located with signals of a second type other than the first type for respective spatial received parameters.

Optionally, the network device determines the first CORESET according to a second CORESET corresponding to a signal of the second type with which the first signal is quasi-co-located for a spatial received parameter.

Optionally, the second CORESET is determined as the first CORESET.

Optionally, different signals of signals of the first type are respectively carried through different transmit beams.

Optionally, the first uplink message is used to notify the network device of a downlink transmit beam expected by the terminal according to a detection result of detecting the at least one signal.

Optionally, the network device determines the first CORESET according to a first correspondence between the at least one signal of the first type and at least one CORESET.

Optionally, a CORESET corresponding to each of the at least one signal is used to send a response message of an uplink message corresponding to the signal.

Optionally, the network device sends first indication information to the terminal, where the first indication information is used to indicate the first correspondence.

Optionally, the first CORESET is determined according to a first uplink transmission resource or a first code, where the first uplink transmission resource is a resource for sending, by the terminal, the first uplink signal, and the first code is a code for identifying the first signal.

Optionally, the first CORESET corresponding to the first uplink transmission resource or first code is determined according to a second correspondence between at least one uplink transmission resource or code and at least one CORESET.

Optionally, each uplink transmission resource or code corresponds to an uplink message of the at least one signal of the first type, and a CORESET corresponding to the uplink transmission resource or code is used to send a response message of the uplink message sent by using the uplink transmission resource or code.

Optionally, the network device sends second indication information to the terminal, where the second indication information is used to indicate the second correspondence.

Optionally, the network device sends a second response message by using the first CORESET, where the second response message is a response message of an uplink message sent on a first random access resource, and the first random access resource is a random access resource corresponding to the first uplink transmission resource.

Optionally, the network device determines a first random access resource, where the first random access resource is a random access resource corresponding to the first uplink transmission resource; the network device determines a third CORESET according to the first random access resource; and the network device determines the first CORESET according to the third CORESET.

Optionally, the third CORESET is used to send a second response message, where the second response message is a response message for an uplink access message sent on the first random access resource.

Optionally, the network device determines the second CORESET corresponding to the first random access resource according to a third correspondence between at least one random access resource and at least one CORESET.

Optionally, a CORESET corresponding to each random access resource is used to send a response message of an uplink access message sent on the random access resource.

Optionally, the network device determines the third CORESET as the first CORESET.

Optionally, the network device sends third indication information to the terminal, where the third indication information is used to indicate the third correspondence.

Optionally, the first uplink transmission resource and the first random access resource are frequency-division multiplexed or code-division multiplexed.

Optionally, the signals of the first type are channel state information reference signals CSI-RS or synchronization signal blocks.

It should be understood that, for a specific implementation in which the network device determines the first CORESET, refer to the description on the terminal side. For brevity, details are not described herein again.

Therefore, in this embodiment of this application, a network device receives a first uplink message, where the first uplink message carries identification information of a first signal received by the terminal, and the first signal includes at least a part of at least one signal of a first type transmitted by the network device; the network device determines the first CORESET; and the network device sends the first response message for the first uplink message on the first CORESET, to transmit a response message of a message carrying identification information used to represent a downlink signal of a beam.

Figure 4:
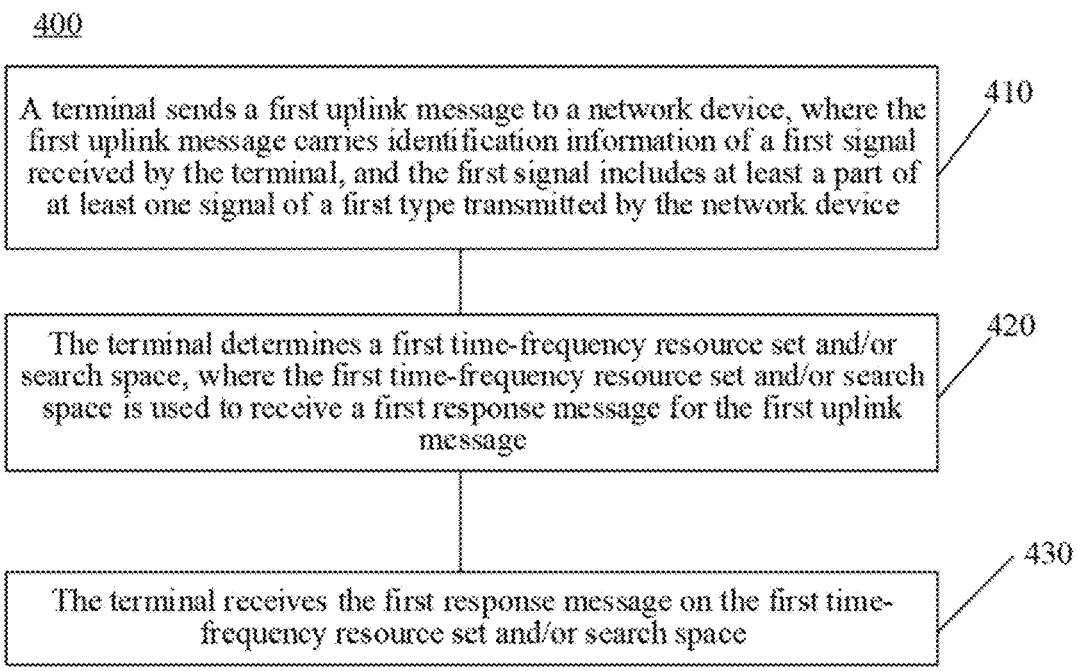
FIG. 4 is a schematic flowchart of a wireless communications method according to an embodiment of this application.

FIG. 4 is a schematic flowchart of a wireless communications method 400 according to an embodiment of this application. The method 400 may be optionally applied to the system shown in FIG. 1, but is not limited thereto. The method 400 may be optionally performed by a terminal. The method 400 includes at least a part of the following content.

In 410, a terminal sends a first uplink message to a network device, where the first uplink message carries identification information of a first signal received by the terminal, and the first signal includes at least a part of at least one signal of a first type transmitted by the network device.

Optionally, the signals of the first type are channel state information reference signals (CSI-RS) or synchronization signal blocks (SS Block).

Optionally, all or a part of the at least one signal of the first type is capable of being respectively quasi-co-located with signals of a second type other than the first type for respective spatial received parameters.

Specifically, the signals of the first type may be quasi-co-located with the signals of the second type for the spatial received parameters. To be specific, the network sends a signal 1 of the first type through a beam 1, and if the signal 1 and a signal 2 of the second type are quasi-co-located for a spatial received parameter, the network sends the signal 2 through the transmit beam 1, or the terminal sends the signal 2 through an uplink transmit beam 1 that is the same as the transmit beam 1.

Optionally, different signals of signals of the first type are respectively carried through different transmit beams.

Specifically, the network device may send downlink signals of the first type through a plurality of transmit beams, for example, CSI-RSs or synchronization signal blocks, and each downlink beam may carry identification information of a sent downlink signal, where different downlink beams carry different identification information of downlink signals. In this case, downlink signals having the same identification information may be referred to as one downlink signal, and a quantity of downlink signals may be equal to a quantity of transmit beams.

Optionally, the first uplink message is used to notify the network device of a downlink transmit beam expected by the terminal according to a detection result of detecting the at least one signal.

Specifically, the terminal may detect the network device through the downlink signals sent through the plurality of transmit beams, and may determine, according to a detection result of the detecting, a transmit beam that has relatively good signal quality (for example, that is optimal or whose quality satisfies a predetermined value) and notify the transmit beam to the network device. Specifically, identification information of a signal whose downlink signal quality is optimal may be notified to the network device.

In 420, the terminal determines a first time-frequency resource set and/or search space, where the first time-frequency resource set and/or search space is used to receive a first response message for the first uplink message.

Optionally, a time-frequency resource set or search space may be used to transmit a PDCCH.

Optionally, a time-frequency resource set and/or search space may include at least one physical downlink control channel (PDCCH) candidate location.

Optionally, a PDCCH candidate may have an aggregation level of 1, 2, 4 or 8, that is, may occupy 1, 2, 4 or 8 control channel elements (CCE).

Optionally, one time-frequency resource set and/or search space may include PDCCH candidates having a plurality of aggregation levels, for example, simultaneously include PDCCH candidates having aggregation levels 1, 2, 4 and 8.

In 430, the terminal receives the first response message on the first time-frequency resource set and/or search space.

Specifically, the terminal may perform blind detection in the first time-frequency resource set and/or search space, so as to obtain the first response message.

For convenience of more clearly understanding this application, how the terminal determines the first time-frequency resource set and/or search space is described below with reference to several implementations.

Manner 1:

The terminal determines the first time-frequency resource set and/or search space according to a second time-frequency resource set and/or search space corresponding to a signal of the second type with which the first signal is quasi-co-located for a spatial received parameter.

Specifically, the terminal may determine a signal of the second type with which the first signal is quasi-co-located for a spatial received parameter, determine a time-frequency resource set and/or search space corresponding to the signal of the second type, and accordingly determine the first time-frequency resource set and/or search space.

The signal of the second type may be an uplink signal, and therefore the time-frequency resource set and/or search space corresponding to the signal of the second type may be a time-frequency resource set and/or search space used to receive a response message for the signal.

Alternatively, the signal of the second type may be a downlink signal, and therefore the time-frequency resource set and/or search space corresponding to the second type may be a time-frequency resource set and/or search space for receiving the signal.

Optionally, at least one signal of the second type and at least one time-frequency resource set and/or search space may have a direct correspondence.

Signals of the second type and time-frequency resource sets and/or search spaces are in a one-to-one correspondence; or a plurality of signals of the second type may correspond to one time-frequency resource set and/or search space; or one signal of the second type may correspond to a plurality of time-frequency resource sets and/or search spaces.

Optionally, the terminal may determine the second time-frequency resource set and/or search space as the first time-frequency resource set and/or search space.

Alternatively, the terminal may change the second time-frequency resource set and/or search space, for example, increase resources or reduce resources, so as to obtain the first time-frequency resource set and/or search space.

Manner 2:

The terminal determines the first time-frequency resource set and/or search space according to a first correspondence between the at least one signal of the first type and at least one time-frequency resource set and/or search space.

Specifically, at least one signal of the first type and at least one time-frequency resource set and/or search space may have a direct correspondence.

Signal having different identification information may correspond to different time-frequency resource set and/or search spaces. For example, signals of the first type and time-frequency resource sets and/or search spaces are in a one-to-one correspondence; or a plurality of signals may correspond to one time-frequency resource set and/or search space; or one signal may correspond to a plurality of time-frequency resource sets and/or search spaces.

Optionally, a time-frequency resource set and/or search space corresponding to each of the at least one signal is used to receive a response message of an uplink message corresponding to the signal.

Optionally, the terminal receives first indication information sent by the network device, where the first indication information is used to indicate the first correspondence. To be specific, the first correspondence may be configured by the network device for the terminal. Certainly, the first correspondence may alternatively be preset in the terminal.

Manner 3:

The terminal determines the first time-frequency resource set and/or search space according to a first uplink transmission resource or a first code, where the first uplink transmission resource is a resource for sending the first uplink signal, and the first code is a code for identifying the first signal.

Specifically, the terminal may determine the first time-frequency resource set and/or search space according to a resource for sending the first uplink signal and a code for identifying the first signal.

In an implementation, the first time-frequency resource set and/or search space corresponding to the first uplink transmission resource or first code is determined according to a second correspondence between at least one uplink transmission resource or code and at least one time-frequency resource set and/or search space.

Specifically, at least one uplink transmission resource and at least one time-frequency resource set and/or search space may have a direct correspondence, where uplink transmission resources for carrying different identification information may correspond to different time-frequency resource set and/or search spaces. For example, uplink transmission resources and time-frequency resource sets and/or search spaces are in a one-to-one correspondence; or a plurality of uplink transmission resources may correspond to one time-frequency resource set and/or search space; or one uplink transmission resource may correspond to a plurality of time-frequency resource sets and/or search spaces.

Herein, a resource for sending one uplink signal (carrying an identifier of one signal of the first type) may be referred to as one resource, but this application is not limited thereto, and a division unit of an uplink transmission resource may alternatively be in another form.

Optionally, the aforementioned uplink transmission resource and a random access resource may be frequency-division multiplexed or code-division multiplexed.

Alternatively, at least one code and at least one time-frequency resource set and/or search space may have a direct correspondence, where codes for identifying different signals of the first type may correspond to different time-frequency resource set and/or search spaces. For example, codes and time-frequency resource sets and/or search spaces are in a one-to-one correspondence; or a plurality of codes may correspond to one time-frequency resource set and/or search space; or one code may correspond to a plurality of time-frequency resource sets and/or search spaces.

Optionally, the aforementioned code and a random access preamble may have a same sequence but different cyclic shifts.

Optionally, codes and uplink signals of the first type may be in a one-to-one correspondence, that is, one code may identify one uplink signal, but this embodiment of this application is not limited thereto. For example, one code may identify a group of signals.

Optionally, each uplink transmission resource or code corresponds to an uplink message of the at least one signal of the first type, and a time-frequency resource set and/or search space corresponding to the uplink transmission resource or code is used to receive a response message of the uplink message sent by using the uplink transmission resource or code.

Optionally, the terminal receives second indication information sent by the network device, where the second indication information is used to indicate the second correspondence. To be specific, the second correspondence may be configured by the network device for the terminal. Certainly, the second correspondence may alternatively be preset in the terminal.

Optionally, a second response message is received by using the first time-frequency resource set and/or search space, where the second response message is a response message of an uplink message sent on a first random access resource, and the first random access resource is a random access resource corresponding to the first uplink transmission resource.

Specifically, the time-frequency resource set and/or search space configured to receive the foregoing first response message may be used to receive the response message of the uplink message sent on the first random access resource. Herein, a random access resource and an uplink transmission resource may have a correspondence, and the correspondence may be optionally related to a multiplexing relationship. To be specific, a random access resource and an uplink transmission resource have a frequency-division multiplexing or code-division multiplexing relationship, and therefore the random access resource is a random access resource corresponding to the uplink transmission resource.

In another implementation, a first random access resource is determined, where the first random access resource is a random access resource corresponding to the first uplink transmission resource; a third time-frequency resource set and/or search space is determined according to the first random access resource; and the first time-frequency resource set and/or search space is determined according to the third time-frequency resource set and/or search space.

Specifically, a random access resource and an uplink transmission resource may have a correspondence, and the correspondence may be optionally related to a multiplexing relationship. To be specific, a random access resource and an uplink transmission resource have a frequency-division multiplexing or code-division multiplexing relationship, and therefore the random access resource is a random access resource corresponding to the uplink transmission resource. The terminal may determine the first random access resource corresponding to the first uplink transmission resource, accordingly determine a time-frequency resource set and/or search space corresponding to the first random access resource, and determine the first time-frequency resource set and/or search space according to the time-frequency resource set and/or search space corresponding to the random access resource.

Optionally, the third time-frequency resource set and/or search space is configured to receive a second response message, where the second response message is a response message for an uplink access message sent on the first random access resource.

Optionally, the second time-frequency resource set and/or search space corresponding to the first random access resource is determined according to a third correspondence between at least one random access resource and at least one time-frequency resource set and/or search space.

Specifically, at least one random access resource and at least one time-frequency resource set and/or search space may have a direct correspondence, where different random access resources may correspond to different time-frequency resource sets and/or search spaces. For example, random access resources and time-frequency resource sets and/or search spaces are in a one-to-one correspondence; or a plurality of random access resources may correspond to one time-frequency resource set and/or search space; or one random access resource may correspond to a plurality of time-frequency resource sets and/or search spaces.

Optionally, a time-frequency resource set and/or search space corresponding to each random access resource is used to receive a response message of an uplink access message sent on the random access resource.

Optionally, the terminal may determine the third time-frequency resource set and/or search space as the first time-frequency resource set and/or search space.

Alternatively, the terminal may change the third time-frequency resource set and/or search space, for example, increase resources or reduce resources, so as to obtain the first time-frequency resource set and/or search space.

Optionally, the terminal receives third indication information sent by the network device, where the third indication information is used to indicate the third correspondence. To be specific, the third correspondence may be configured by the network device for the terminal. Certainly, the third correspondence may alternatively be preset in the terminal.

Therefore, in this embodiment of this application, a terminal sends a first uplink message to a network device, where the first uplink message carries identification information of a first signal received by the terminal, and the first signal includes at least a part of at least one signal of a first type transmitted by the network device; the terminal determines a first time-frequency resource set and/or search space; and the terminal receives the first response message for the first uplink message on the first time-frequency resource set and/or search space, to transmit a response message of a message carrying identification information used to represent a downlink signal of a beam.

Figure 5:
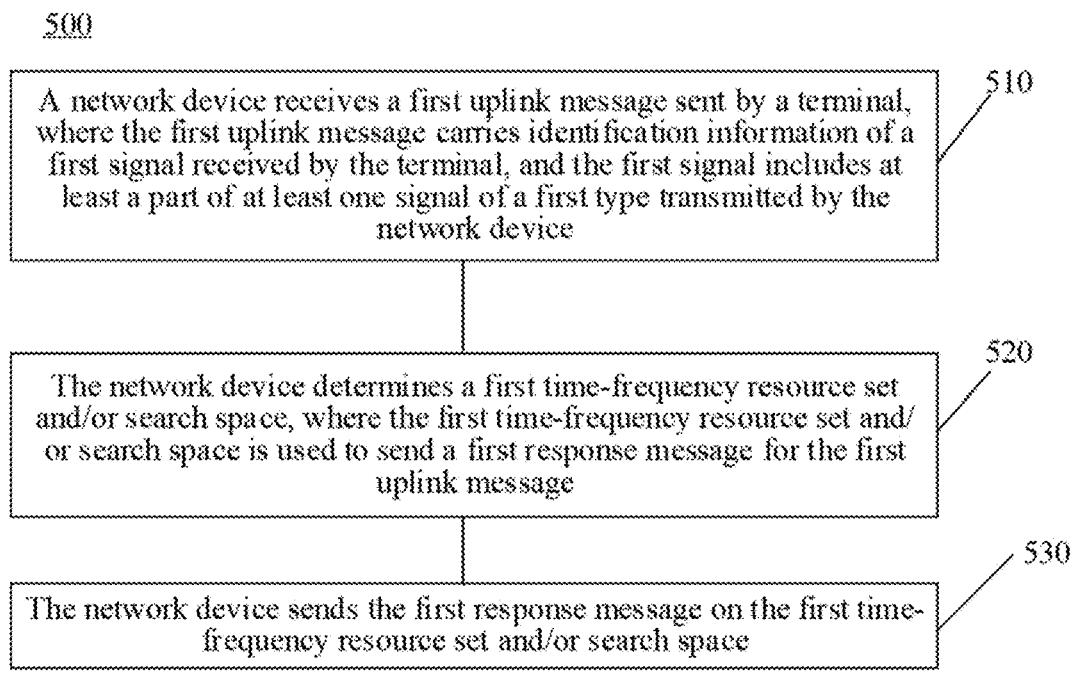
FIG. 5 is a schematic flowchart of a wireless communications method according to an embodiment of this application.

FIG. 5 is a schematic flowchart of a wireless communications method 500 according to an embodiment of this application. The method 500 includes at least a part of the following content.

In 510, a network device receives a first uplink message sent by a terminal, where the first uplink message carries identification information of a first signal received by the terminal, and the first signal includes at least a part of at least one signal of a first type transmitted by the network device.

In 520, the network device determines a first time-frequency resource set and/or search space, where the first time-frequency resource set and/or search space is used to send a first response message for the first uplink message.

In 530, the network device sends the first response message on the first time-frequency resource set and/or search space.

Optionally, all or a part of the at least one signal of the first type is capable of being respectively quasi-co-located with signals of a second type other than the first type for respective spatial received parameters.

Optionally, the network device determines the first time-frequency resource set and/or search space according to a second time-frequency resource set and/or search space corresponding to a signal of the second type with which the first signal is quasi-co-located for a spatial received parameter.

Optionally, the second time-frequency resource set and/or search space is determined as the first time-frequency resource set and/or search space.

Optionally, different signals of signals of the first type are respectively carried through different transmit beams.

Optionally, the first uplink message is used to notify the network device of a downlink transmit beam expected by the terminal according to a detection result of detecting the at least one signal.

Optionally, the network device determines the first time-frequency resource set and/or search space according to a first correspondence between the at least one signal of the first type and at least one time-frequency resource set and/or search space.

Optionally, a time-frequency resource set and/or search space corresponding to each of the at least one signal is used to send a response message of an uplink message corresponding to the signal.

Optionally, the network device sends first indication information to the terminal, where the first indication information is used to indicate the first correspondence.

Optionally, the first time-frequency resource set and/or search space is determined according to a first uplink transmission resource or a first code, where the first uplink transmission resource is a resource for sending, by the terminal, the first uplink signal, and the first code is a code for identifying the first signal.

Optionally, the first time-frequency resource set and/or search space corresponding to the first uplink transmission resource or first code is determined according to a second correspondence between at least one uplink transmission resource or code and at least one time-frequency resource set and/or search space.

Optionally, each uplink transmission resource or code corresponds to an uplink message of the at least one signal of the first type, and a time-frequency resource set and/or search space corresponding to the uplink transmission resource or code is used to send a response message of the uplink message sent by using the uplink transmission resource or code.

Optionally, the network device sends second indication information to the terminal, where the second indication information is used to indicate the second correspondence.

Optionally, the network device sends a second response message by using the first time-frequency resource set and/or search space, where the second response message is a response message of an uplink message sent on a first random access resource, and the first random access resource is a random access resource corresponding to the first uplink transmission resource.

Optionally, the network device determines a first random access resource, where the first random access resource is a random access resource corresponding to the first uplink transmission resource; the network device determines a third time-frequency resource set and/or search space according to the first random access resource; and the network device determines the first time-frequency resource set and/or search space according to the third time-frequency resource set and/or search space.

Optionally, the third time-frequency resource set and/or search space is used to send a second response message, where the second response message is a response message for an uplink access message sent on the first random access resource.

Optionally, the network device determines the second time-frequency resource set and/or search space corresponding to the first random access resource according to a third correspondence between at least one random access resource and at least one time-frequency resource set and/or search space.

Optionally, a time-frequency resource set and/or search space corresponding to each random access resource is used to send a response message of an uplink access message sent on the random access resource.

Optionally, the network device determines the third time-frequency resource set and/or search space as the first time-frequency resource set and/or search space.

Optionally, the network device sends third indication information to the terminal, where the third indication information is used to indicate the third correspondence.

Optionally, the first uplink transmission resource and the first random access resource are frequency-division multiplexed or code-division multiplexed.

Optionally, the signals of the first type are channel state information reference signals CSI-RS or synchronization signal blocks.

It should be understood that, for a specific implementation in which the network device determines the first time-frequency resource set and/or search space, refer to the description on the terminal side. For brevity, details are not described herein again.

Therefore, in this embodiment of this application, a network device receives a first uplink message, where the first uplink message carries identification information of a first signal received by the terminal, and the first signal includes at least a part of at least one signal of a first type transmitted by the network device; the network device determines a first time-frequency resource set and/or search space; and the network device sends the first response message for the first uplink message on the first time-frequency resource set and/or search space, to transmit a response message of a message carrying identification information used to represent a downlink signal of a beam.

Figure 6:
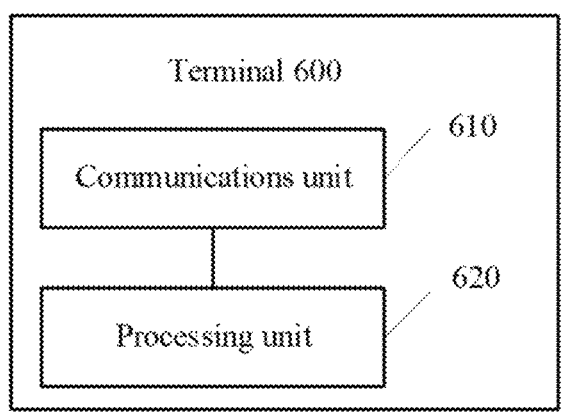
FIG. 6 is a schematic block diagram of a terminal according to an embodiment of this application.

FIG. 6 is a schematic block diagram of a terminal 600 according to an embodiment of this application. As shown in FIG. 6, the terminal 600 includes a communications unit 610 and a processing unit 620.

Optionally, the communications unit 610 is configured to send a first uplink message to a network device, where the first uplink message carries identification information of a first signal received by the terminal, and the first signal includes at least a part of at least one signal of a first type transmitted by the network device; the processing unit 620 is configured to determine a first control resource set CORESET, where the first CORESET is used to receive a first response message for the first uplink message; and the communications unit is configured to receive the first response message on the first CORESET.

Optionally, the communications unit 610 is configured to send a first uplink message to a network device, where the first uplink message carries identification information of a first signal received by the terminal, and the first signal includes at least a part of at least one signal of a first type transmitted by the network device; the processing unit 620 is configured to determine a first time-frequency resource set and/or search space, where the first time-frequency resource set and/or search space is used to receive a first response message for the first uplink message; and the communications unit 610 is configured to receive the first response message on the first time-frequency resource set and/or search space.

It should be understood that, the terminal 600 may correspond to the terminal in the method embodiment, and may implement corresponding operations implemented by the terminal in the method embodiment. For brevity, details are not described herein again.

Figure 7:
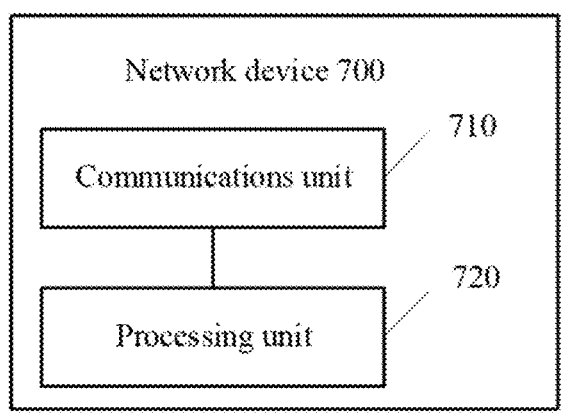
FIG. 7 is a schematic block diagram of a network device according to an embodiment of this application.

FIG. 7 is a schematic block diagram of a network device 700 according to an embodiment of this application. As shown in FIG. 7, the network device 700 includes a communications unit 710 and a processing unit 720, where the communications unit 710 is configured to receive a first uplink message sent by a terminal, where the first uplink message carries identification information of a first signal received by the terminal, and the first signal includes at least a part of at least one signal of a first type transmitted by the network device; the processing unit 720 is configured to determine a first control resource set CORESET, where the first CORESET is used to send a first response message for the first uplink message; and the communications unit 710 is further configured to send the first response message on the first CORESET.

Optionally, the communications unit 710 is configured to receive a first uplink message sent by a terminal, where the first uplink message carries identification information of a first signal received by the terminal, and the first signal includes at least a part of at least one signal of a first type transmitted by the network device; the processing unit 720 is configured to determine a first time-frequency resource set and/or search space, where the first time-frequency resource set and/or search space is used to send a first response message for the first uplink message; and the communications unit 710 is further configured to send the first response message on the first time-frequency resource set and/or search space.

It should be understood that, the network device 700 may correspond to the network device in the method embodiment, and may implement corresponding operations implemented by the network device in the method embodiment. For brevity, details are not described herein again.

Figure 8:
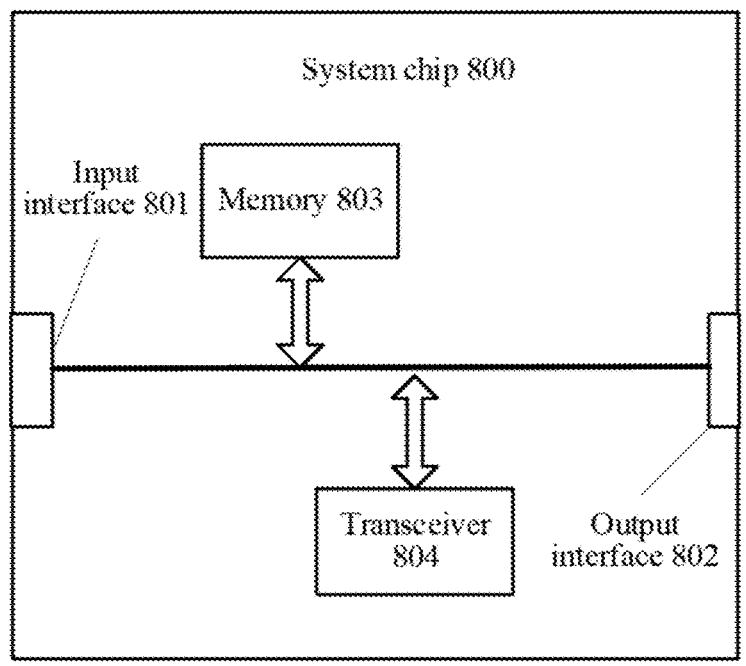
FIG. 8 is a schematic block diagram of a system chip according to an embodiment of this application.

FIG. 8 is a schematic structural diagram of a system chip 800 according to an embodiment of this application. The system chip 800 in FIG. 8 includes an input interface 801, an output interface 802, a processor 803 and a memory 804 that may be connected to each other by using an internal communications connection line, and the processor 803 is configured to execute code in the memory 804.

Optionally, when the code is executed, the processor 803 implements the method performed by the network device in the method embodiment. For brevity, details are not described herein again.

Optionally, when the code is executed, the processor 803 implements the method performed by the terminal in the method embodiment. For brevity, details are not described herein again.

Figure 9:
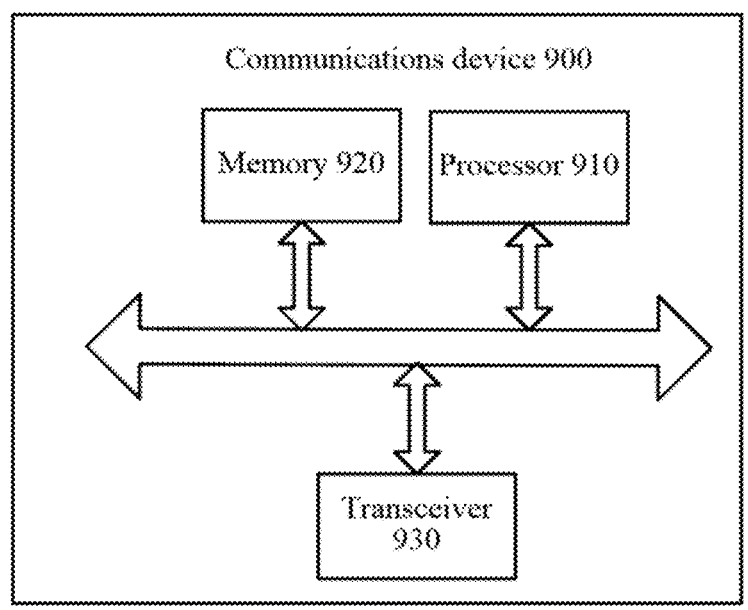
FIG. 9 is a schematic block diagram of a communications device according to an embodiment of this application.

FIG. 9 is a schematic block diagram of a communications device 900 according to an embodiment of this application. As shown in FIG. 9, the communications device 900 includes a processor 910 and a memory 920. The memory 920 may store program code, and the processor 910 may execute the program code stored in the memory 920.

Optionally, as shown in FIG. 9, the communications device 900 may include a transceiver 930, and the processor 910 may control the transceiver 930 to communicate with the outside.

Optionally, the processor 910 may invoke program code stored in the memory 920, to perform corresponding operations of the network device in the method embodiment. For brevity, details are not described herein again.

Optionally, the processor 910 may invoke program code stored in the memory 920, to perform corresponding operations of the terminal in the method embodiment. For brevity, details are not described herein again.

It should be understood that, the processor of this embodiment of this application may be an integrated circuit chip, and has a signal processing capability. During implementation, the steps of the foregoing method embodiment may be implemented by using a hardware integrated logic circuit in the processor or implemented by using an instruction in a software form. The foregoing processor may be a general purpose processor, a digital signal processor (DSP), an application-specific integrated circuit (ASIC), a field programmable gate array (FPGA), or another programmable logical device, discrete gate or transistor logical device, or discrete hardware component. The processor may implement or perform methods, steps and logical block diagrams disclosed in the embodiments of this application. The general purpose processor may be a microprocessor or the processor may be any conventional processor and the like. Steps of the methods disclosed with reference to the embodiments of this application may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It can be understood that, the memory in the embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM). It should be noted that, the memory for the system and the method described herein aims to include but not limited to these memories and any other suitable types of memories.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the embodiment of this application. The foregoing storage medium includes: any medium that can store program codes, such as a USB flash disk, a removable hard disk, a read-only memory (ROM), a random access memory (RAM), a magnetic disk, or an optical disk.

The foregoing descriptions are merely specific implementation manners of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communications method comprising:
   receiving a first signal by a terminal;
   sending, by the terminal, a first uplink message, wherein the first uplink message comprises identification information of the first signal, and the first signal comprises a channel state information reference signal (CSI-RS) or a synchronization signal block;
   determining, by the terminal, a first control resource set (CORESET) according to a correspondence between the first signal and a CORESET; and
   receiving, by the terminal, a first response message, responding to the first uplink message, on the first CORESET.

2. The method of claim 1, wherein determining, by the terminal, the first control resource set (CORESET) according to the correspondence between the first signal and the CORESET comprises:
   determining, by the terminal, the first control resource set in accordance with a correspondence between the first signal and a search space.

3. The method of claim 1, wherein receiving, by the terminal, the first response message, responding to the first uplink message, on the first CORESET comprises:
   performing, by the terminal, blind detection in the first CORESET; and
   obtaining, by the terminal, the first response message responding to the first uplink message.

4. The method of claim 1 wherein the first signal is respectively quasi-co-located with signals other than the first signal for respective spatial received parameters.

5. The method of claim 1 wherein different signals of the first signal are respectively carried through different transmit beams.

6. The method of claim 5 wherein the first uplink message is used to notify a network device of a downlink transmit beam according to a detection result of detecting the first signal.

7. The method of claim 1 wherein the first CORESET is used to receive a response message of an uplink message corresponding to the first signal.

8. The method of claim 1 further comprising:
   receiving, by the terminal, first indication information, wherein the first indication information is used to indicate the correspondence.

9. The method of claim 1 wherein determining, by the terminal, the first control resource set (CORESET) comprises:
   determining the first CORESET according to a first code, wherein the first code is a code for identifying the first signal.

10. The method of claim 9 wherein determining the first CORESET according to a first uplink transmission resource or the first code comprises:
    determining the first CORESET corresponding to the first code according to a second correspondence between at least one code and at least one CORESET.

11. The method of claim 10 wherein the at least one code corresponds to an uplink message of the first signal, and a CORESET corresponding to the at least one code is used to receive a response message of the uplink message sent by using the at least one code.

12. The method of claim 10 further comprising:
    receiving second indication information, wherein the second indication information is used to indicate the second correspondence.

13. A terminal comprising a communications unit and a processing unit, wherein:
    the communications unit is configured to receive a first signal and send a first uplink message, wherein the first uplink message comprises identification information of the first signal, and the first signal comprises a channel state information reference signal (CSI-RS) or a synchronization signal block;
    the processing unit is coupled to the communications unit and configured to determine a first control resource set (CORESET), according to a correspondence between the first signal and a CORESET; and
    the communications unit is configured to receive a first response message, responding to the first uplink message, on the first CORESET.

14. The terminal of claim 13, wherein the processing unit is further configured to determine the first control resource set (CORESET) in accordance with a correspondence between the first signal and a search space.

15. The terminal of claim 13, wherein the communications unit is further configured to:
    perform blind detection in the first CORESET; and obtain the first response message responding to the first uplink message.

16. The terminal of claim 13 wherein the first signal is respectively quasi-co-located with signals other than the first signal for respective spatial received parameters.

17. The terminal of claim 13 wherein different signals of signals of the first signal are respectively carried through different transmit beams.

18. The terminal of claim 17 wherein the first uplink message is used to notify a network device of a downlink transmit beam according to a detection result of detecting the first signal.

19. The terminal of claim 13 wherein the first CORESET is used to receive a response message of an uplink message corresponding to the first signal.

20. The terminal of claim 13 wherein the communications unit is further configured to:
receive first indication information, wherein the first indication information is used to indicate the correspondence.

21. The terminal of claim 13 wherein the processing unit is further configured to:
determine the first CORESET according to a first code, wherein the first code is a code for identifying the first signal.

22. The terminal of claim 21 wherein the processing unit is further configured to:
determine the first CORESET corresponding to the first code according to a second correspondence between at least one code and at least one CORESET.

23. The terminal of claim 22 wherein the at least one code corresponds to an uplink message of at least one signal of a first type, and a CORESET corresponding to the at least one code is used to receive a response message of the uplink message sent by using the at least one code.

24. The terminal of claim 22 wherein the communications unit is further configured to:
receive second indication information, wherein the second indication information is used to indicate the second correspondence.

* * * * *